US006616535B1

(12) United States Patent
Nishizaki et al.

(10) Patent No.: US 6,616,535 B1
(45) Date of Patent: Sep. 9, 2003

(54) IC CARD SYSTEM FOR A GAME MACHINE

(75) Inventors: Tsutao Nishizaki, Kawasaki (JP); Shin Iwagami, Kanagawa-ken (JP); Futoshi Itoh, Tokyo (JP); Shingo Dote, Yokohama (JP)

(73) Assignees: Schlumberger Systems, Montrouge (FR); Toppan Label Co., Ltd., Tokyo (JP); Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/423,426

(22) PCT Filed: Mar. 1, 1999

(86) PCT No.: PCT/IB99/00340

§ 371 (c)(1),
(2), (4) Date: Jan. 21, 2000

(87) PCT Pub. No.: WO99/46741

PCT Pub. Date: Sep. 16, 1999

(30) Foreign Application Priority Data

Mar. 9, 1998 (JP) ........................................ H10-056975
Mar. 9, 1998 (JP) ........................................ H10-056976

(51) Int. Cl.[7] ............................ G06F 17/00; G06K 5/00
(52) U.S. Cl. .......................................... 463/43; 235/380
(58) Field of Search .............................. 463/25, 26, 27, 463/29, 40, 41, 42, 43, 44, 47; 902/25, 26, 23, 22; 235/380, 382

(56) References Cited

U.S. PATENT DOCUMENTS 4,652,998 A 3/1987 Koza et al. ................. 364/412
4,764,666 A * 8/1988 Bergeron .................... 235/380
5,179,517 A * 1/1993 Sarbin et al. ............... 364/410
5,902,983 A * 5/1999 Crevelt et al. ............. 235/380
6,003,014 A * 12/1999 Lee et al. ...................... 705/13
6,045,447 A * 4/2000 Yoshizawa et al. ........... 463/31
6,089,982 A * 7/2000 Holch et al. .................. 463/42

FOREIGN PATENT DOCUMENTS

WO WO 96/08798 3/1996

* cited by examiner

*Primary Examiner*—Kim Nguyen
(74) *Attorney, Agent, or Firm*—Rosenthal & Osha L.L.P.

(57) ABSTRACT

An IC card system for a game machine using an IC card includes a game token input device for inputting a game token onto the IC card based on the amount of money deposited. The IC card system also includes a game device that decreases the number of game tokens stored on the IC card when the IC card is used with the game device. The IC system also includes a totaling device that determines the number of tokens inputted by the game token input device and the number of tokens used by the game devices, at a particular location.

9 Claims, 6 Drawing Sheets

IC CARD SYSTEM FOR A GAME MACHINE

FIELD OF THE INVENTION

The present invention relates to an integrated circuit (IC) card system for an electronic game machine, to a security system for an IC card and to a game system using an IC card.

BACKGROUND OF THE INVENTION

Recently, a number of facilities and establishments have been created that are equipped with electronic game machines, for example, the so-called game centres. In these game centres, individuals can play the desired games as many times as they want by depositing money in the game machines. Consequently, players are required to bring money with them to the game centresin order play the games and as each game requires depositing money the players have to carry a lot of money with them, which can be very inconvenient. Furthermore, the shop or game centreis required to handle and count the various metal and paper currencies deposited in the game machines or in money exchange machines. This is troublesome and time consuming in order to determine the amount of income derived from operation of the game machines.

BRIEF SUMMARY OF THE INVENTION

One object of the present invention is to provide an IC card system for a game machine, which allows the users to play games without carrying money.

Another object of the invention is to easily collect and sum up data such as an amount sold.

A further object is to provide a security system for the IC card system to enable high levels of security against unauthorised use.

A first aspect of the invention provides an IC card system for a game machine in which is used an IC card from or to which is read or written a game token for allowing a game device capable of executing games to execute games.

A preferred embodiment of the invention provides an IC card system for a game machine comprising: a game token input means for inputting into an IC card a game token based on an amount of money deposited and issuing the IC card; a game device which, upon insertion of the IC card, substantially decreases a value of game token in the IC card and allows an execution of a game based on the decreased game token; and a totalling means for a shop which is installed in each shop having a game device and collects and sums up, for each IC card, the values of game token input by the game token input means and the values of game token decreased by the game device respectively.

Such an IC card system can further comprise a game token increase means for substantially increasing a value of game token in the IC card based on an amount of money deposited, wherein, as a totalling means for a shop or game centre, an increased token totalling section for collecting and summing up values of game token increased by the game token increase means for each IC card is provided.

As the game token input means, a user information writing section for writing user information about an IC card user on thethe IC card can be provided, and, as the totalling means for a shop, a user information totalling section far collecting and summing up user information in the IC card for the IC card having game token decreased by the game device can be provided.

The IC card system for a game machine can further comprise an overall totalling means for collecting and summing up totalled results of all shops generated by respective totalling means for a shop.

A game result sending section for a shop can be used to send a game result to the totalling means for a shop in response to an input of a totalling command when the game is finished; and a game result totalling section which is installed in the totalling means for a shop collects and sums up game results sent from the game result sending section for a shop.

An IC card system for a game machine according to a further embodiment of the invention comprises: a game result storing means for storing the game result in the IC card in response to an input of a storing command when the game being finished; a non-profit game means which is disposed in a location other than the shop and which allows the game to be executed commencing with the previously finished status based on the game result in the IC card; a game result sending means for sending the game result of the non-profit game means in response to an input of a sending command when the game is finished; and a non-profit game result totalling means for collecting and summing up the game results sent from the game result sending means; wherein the overall totalling means collects and sums up all of the totalled results including those generated by respective nonprofit game result totalling means.

In one preferred embodiment, the game device is provided with a game succeeding section which allows the game to be executed commencing with the previously finished status based on the game result in the IC card, and the game result in the IC card is allowed to be used in both of the game vice belonging to the shop and the non-profit same means disposed in the other location.

Thus, the invention uses an IC card from or to which is read or written the game token for allowing the game device to execute the game, so that the game can be executed without the need for the user to carry or insert money.

The game token input means inputs into the IC card the game token based on an amount of money deposited and issues the IC card, and the game device, when the IC card is inserted, substantially decreases the value of game token in the IC card and allows a game to be executed based on the decreased game token. The game token increase means substantially increases the value of game token in the IC card based on an amount of money deposited, and the totalling means for a shop installed in each shop having a game device collects and sums up, for each IC card, the values of game token input by the game token input means, the values of game token decreased by the game device, and the values of game token increased by the game token increase means respectively, so that the game can be executed without the need to insert money and the amount sold by the shop can be easily determined.

The user information may be linked with the totalled results relating to game tokens corresponding, so that promotional activities can be created based on user information to encourage further use of the game system.

The overall totalling means collects and sums the totalled results of all shops generated by respective totalling means for a shop, so that, by making each shop, for example, publish overall shop ranking, together with other promotional activities can be used to promote use of the games.

The game result sending section for a shop sends the game result to the totalling means for a shop in response to the input of the totalling command when the game is finished, and the game result totalling section of the totalling means for a shop collects and sums the game results sent from the game result sending section for a shop, so that a user with an excellent score and the game result thereof may be found.

The game result storing means stores the game result in the IC card in response to the input of the storing command when the game is finished, the non-profit game means disposed in another location can then execute the game commencing at the previously finished status based on the game result in the IC card. The game result sending means sends the game result of the non-profit game means in response to the input of the sending command when the game is finished, the non-profit game result totalling means collects and sums up the game results sent from the game result sending means, and then the overall totalling means collects and sums up the totalled results including those generated by all non-profit game result totalling means, and the game results may be stored in the IC card and this enables the game to be executed on the non-profit game means such as those for home use following the game devices in the shop and vice versa. Thus use of a game machine requiring long time can be encouraged.

In addition, the overall totalling means is allowed to integrally manage a user who uses both of the game devices of each shop and the non-profit game means for home use.

The game device can be provided with a game succeeding section which allows the game to be executed commencing with the previously finished status based on the game result in the IC card, so that the game result in the IC card is allowed to be used in both of the game device belonging to the shop and the non-profit game means disposed in another location.

A further aspect of the invention provides a security system for an IC card for a game including a game token increase means which has a security verification function operable on use to confirm valid use of the system. This can be provided in addition to any or all of the various embodiments of the previous aspect of the invention.

In one embodiment, the game token increase means comprises a historical information writing section for writing a historical information into the IC card when increasing the game token.

As an alternative to, or in addition to the historical information writing section, a start check section for introducing an active state capable of processing an increase when, upon starting, based on an ID storage means for an administrator and that for an operator, each having individual ID, it has determined that the information corresponding to each of the ID storage means is valid.

As another alternative or addition, the game token increase means comprises, in place of the historical information writing section, a start check section for introducing an active state capable of processing an increase when, upon starting, an IC card for administrator and that for operator, each having individual card ID, are inserted and each of the IC cards is determined as valid.

Preferably, the game token increase means further comprises a password check section.

In one embodiment, the password check section moves to an active state capable of processing an increase when, upon starting, respective passwords are input corresponding to an ID storage means for an administrator and that for an operator respectively, each being associated with or holding individual passwords, the individual passwords coincide with the input passwords for each ID storage means, and the information corresponding to each of the ID storage means is determined as valid.

In another embodiment, password check section moves to an active state capable of processing an increase when, upon starting, an IC card for an administrator and that for an operator, each holding individual password, are inserted, respective passwords are input corresponding to the IC card for an administrator and that for an operator respectively, the individual passwords coincide with the input passwords for each IC card, and each of the IC cards is determined as valid.

The security system according to the invention also provides for encrypting a game result and storing it in the IC card and allows the game to be executed in a non-profit game system commencing at the previously finished state based on the encrypted game result in the IC card An IC card for a game according to one preferred embodiment comprises: a game data input device for inputting into an IC card a game token based on an amount of money deposited and issuing the IC card; a game machine with read/write (R/W) which, upon insertion of the IC card, substantially changes a value of game token in the IC card and allows an execution of a game based on the game token; an adder for substantially increasing a value of game token in the IC card based on an amount of money deposited; and a data totalling device which is installed in each shop having a game machine with R/W and collects and sums up the value of game token input into the IC card issued by the game data input device, the value of game token changed by the game machine with R/W, and the value of game token increased by the adder, according to the IC card or the determined conditions; wherein the combination of the IC card and the game machine with R/W and the combination of the IC card and the adder each have such function that a device belonging to either combination executes verification of authorisation of the other based on what they have received from the other.

In one embodiment, each of the IC card, the game machine with R/W, and the adder individually execute verification of authorisation of others to which they will transmit, based on what they have received.

The historical information writing section writes the historical information into the IC card when the game token is increased by the game token increase means, and thereby the system can detect a suspiciously improper IC card to prevent it from being used based on the contents of the historical information even if the game token was increased improperly, so that the game can be executed without the need to deposit money and with superior security to improper or unauthorised use.

The start check section, upon starting, moves the game token increase means to an active state capable of processing the increase when it has determined based on the ID storage means for the administrator and that for the operator, each having individual ID, that the information corresponding to each of the ID storage means is valid, the game token increase means cannot be activated unless there are two pieces of information corresponding to respective ID storage means managed by different persons, so that, the system can accomplish high level of security to the improper usage due to theft of the IC cards for the administrator and the operator, or misappropriation and the like.

The information corresponding to the ID storage means, may be appropriately employable as the ID information in a storage medium, such as IC card or memory card, or information consisting of input password and the like.

Since the IC card for the administrator and that for the operator can be respectively defined as the ID storage means for the administrator and that for the operator, the game token increase means cannot be activated unless there are two separate IC cards which are managed by different persons, so that the system can accomplish high level of security to the improper usage due to theft of the IC cards for the administrator and the operator, or misappropriation and the like.

When the game token increase means includes, in addition to the operation of the start check section, the password check section to confirm the password, the game token increase means could not be activated even if the two of the ID storage means for the administrator and the operator have been stolen, so that, higher level of security can be achieved.

The user information can be linked with the total operation of the game token, promotional or incentive programs can be employed, for example, by arranging such project as setting birthday promotion prices using these data.

When the game result is encrypted and stored in the IC card, consistency of the game data is ensured and allows for protection of the results and fair treatment of users in comparisons.

Additional objects and advantages of the present invention will be set forth in the description which follows, and in part will be obvious from the description, or may be learned by practice of the present invention.

The objects and advantages of the present invention may be realised and obtained by means of the instrumentalities and combinations particularly pointed out in the appended claims.

BRIEF DESCRIPTION OF THE DRAWINGS

The accompanying drawings, which are incorporated in and constitute a part of the specification, illustrated presently preferred embodiments of the present invention and, together with the general description given above and the detailed description of the preferred embodiments given below, serve to explain the principles of the present invention.

DETAILED DESCRIPTION OF THE INVENTION

There will now be described preferred embodiments of the present invention with reference to the drawings.

Figure 1:
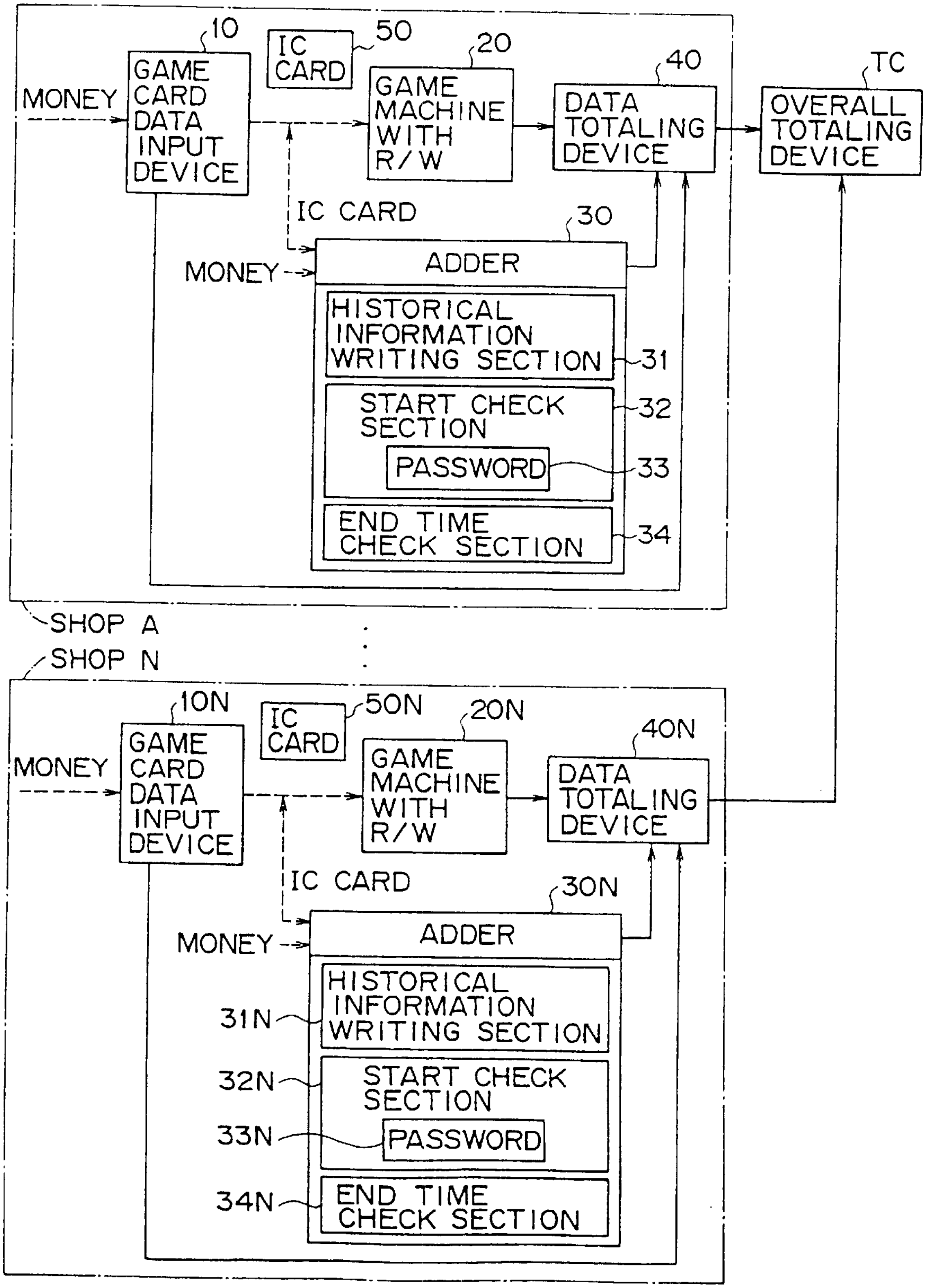
FIG. 1 is a schematic drawing illustrating an example of an IC card system with security features for a game according to one embodiment of the present invention.
Figure 2:
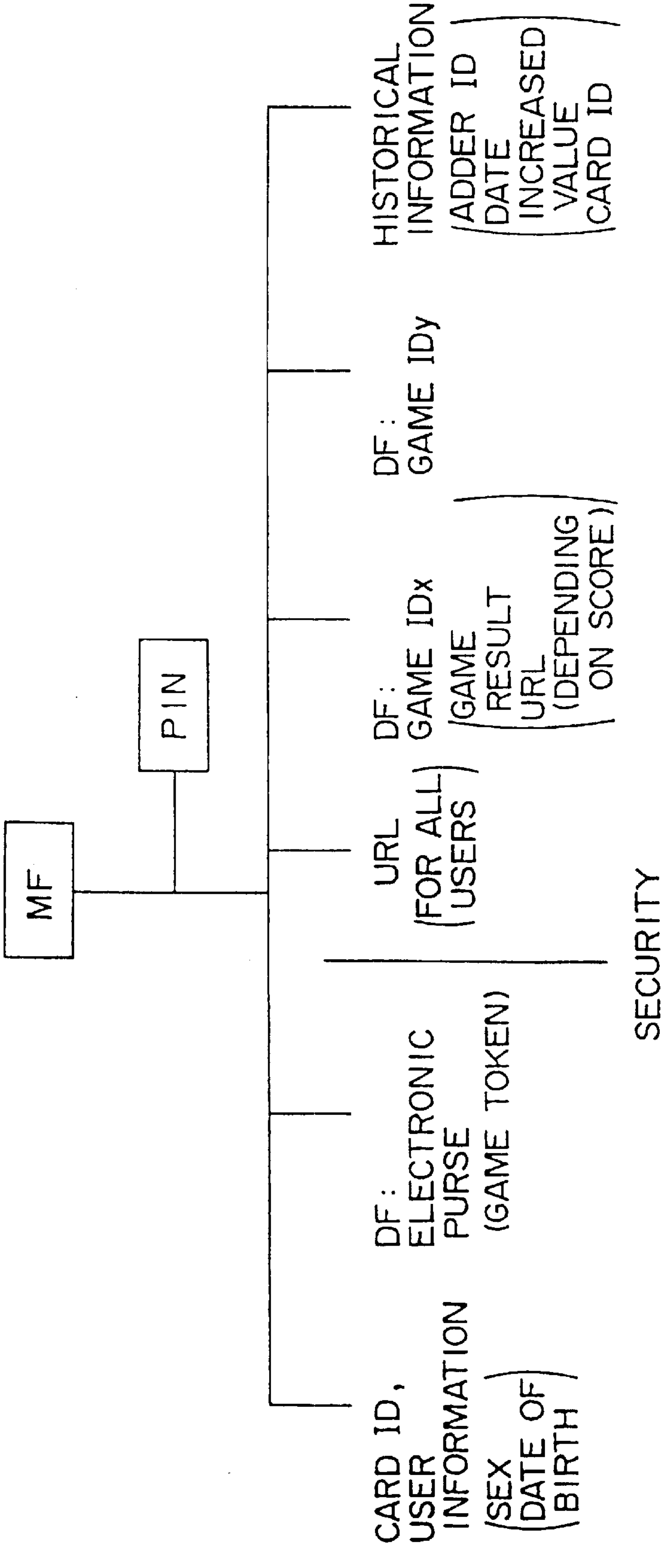
FIG. 2 is a schematic drawing illustrating a file structure of the IC card of FIG. 1.

FIG. 1 is a schematic drawing illustrating an IC card system for a game machine according to one embodiment of the present invention, and FIG. 2 is a schematic drawing illustrating a file structure of an IC card applied to the IC card system for a game machine. In the IC card system for a game machine of the present embodiment, an IC card is applied to a game machine in an amusement (AM) facility such as so-called a game centre. This type of IC card system for the game machine, in one particular implementation, comprises a plurality of shops A–N of an amusement facility and an overall totalling device TC connected to each of the shops A–N. Since each of the shops A–N has the same structure with the exception of a number and an arrangement of respective devices and contents of the games, the structure of the shop A will be taken as an example for description.

The shop A is provided with a game card data input device 10, a game machine with R/W (reader/writer) 20, an adder 30, and a data totalling device 40. Though not shown, an arbitrary number of game card data input devices 10, game machines with R/W 20 and adders 30 are provided respectively. The game card data input devices 10 has a game token input function for inputting a game token (game execution right) to an electronic purse of an IC card 50 shown in FIG. 2 based on an amount of money deposited and issuing the IC card 50. The IC card 50 has been specifically initialised when manufactured or when first issued. This specific initialisation is directed to such information as specific ATR (Answer To Reset) or specific card ID information, which has an attribute that could not be re-written by a user. The game token is used as a substitute of normal money, and, in reality, is data indicating a degree of the right allowing the game to be executed. That is, it has a function to allow the desired game to be executed a certain times corresponding to an value thereof. For example, though the game token is usually a coin made of metal or plastics, the present invention employs digital data stored in an IC card, whose value can be increased or decreased by re-writing.

The game token is preferably neither compatible with those of the traditional system nor exchangeable for money from the viewpoint of security. In order to make sure of security in a transaction of the game token, the game card data input device 10, the game machine with R/W 20, the adder 30 are equipped with a secure access module SAM which substantially performs transaction of the game token with the IC card 50.

The game machine 20 has functions of, upon insertion of the IC card 50: determining whether the IC card has been specifically initialised or not; executing authorisation processing of the IC card 50 based on the information, such as card ID in the IC card 50 when the determination indicates the specific initialisation does exist; and substantially decreasing the value of game token in the IC card 50 to allow the execution of the game based on the decreased game token when the IC card has been authorised as proper.

This determination of the existence of the initialisation is preferably performed in a "black-box" function independently from the high level computer associated with game function in the game machine 20, by, for example, in firmware.

Figure 3:
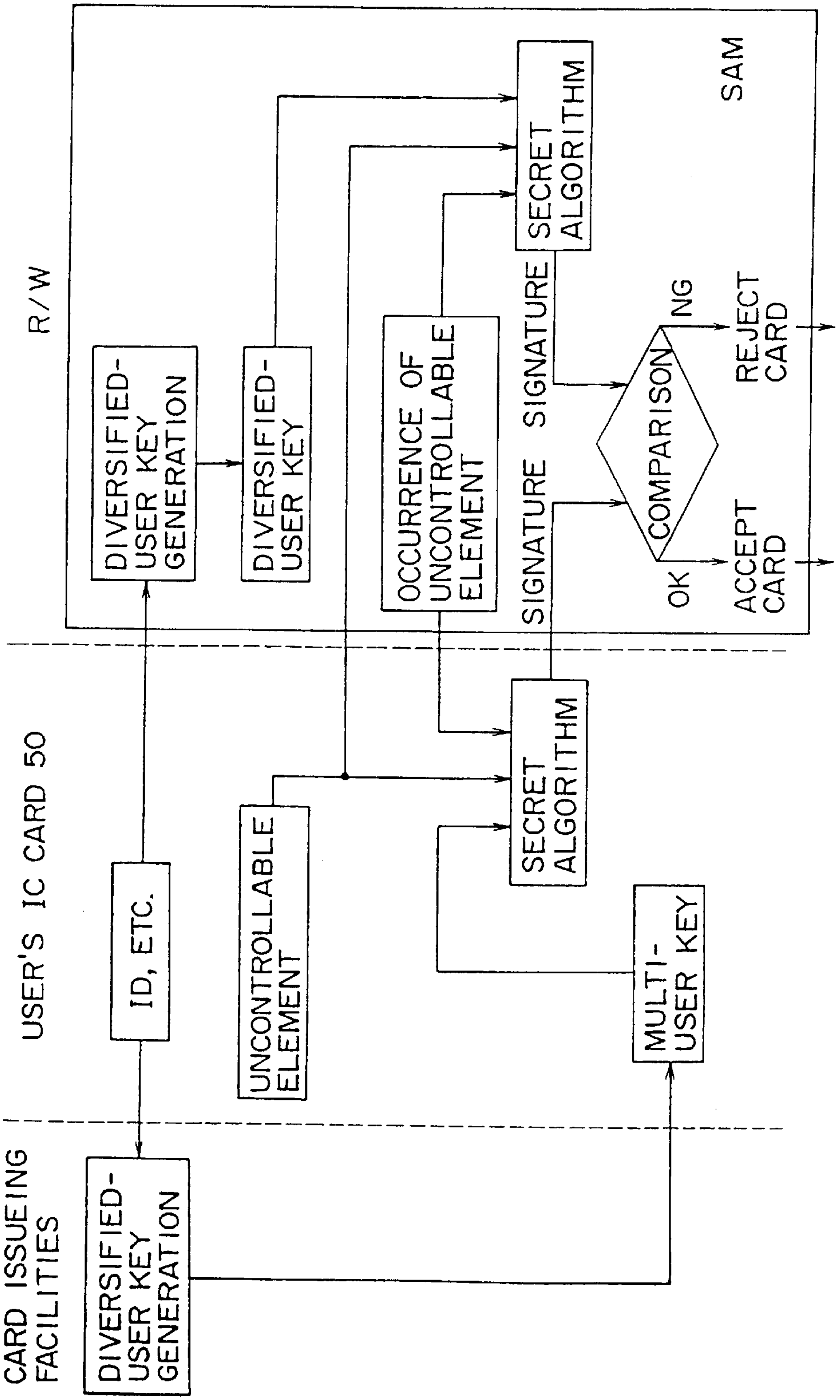
FIG. 3 is a schematic drawing illustrating a partial structure of SAM of the system of FIG. 1.

The authorisation processing and the decrease processing are preferably performed by SAM (Secure Access Module) from the viewpoint of security reliability. SAM is a device which (1) keeps confidential information secret, such as diversified user key generation algorithm, (2), when the user's IC card is inserted, as shown in FIG. 3, performs so-called dynamic card authorisation with the IC card 50, which interposes uncontrollable element such as random number; and (3) performs the operation of increasing (addition) or decreasing (subtraction) of game token for the electronic purse of the IC card 50.

"To substantially decrease" does not necessarily mean that the value of digital data corresponding to the game token is decreased but means that the degree of game execution right is decreased regardless of Increase or decrease of the value of digital data. For example, when the increase and decrease direction is set to be of the same in both of the degree of game execution right and the value of digital data, the value of game token is increased (0→+) in proportion to an amount of money deposited, and is decreased (−←0) each time when the game is executed. Alternately, when the increase and decrease direction is set to be inverse between the degree of game execution right and the value of digital data, the value of game token is decreased (−←0) in proportion to an amount of money deposited, and is increased (−→0) each time when the game is executed. In both cases, the degree of game execution right is proportional to an amount of money deposited. That is, the game token is substantially decreased each time the game is executed and is increased in proportion to an amount of money deposited.

The R/W game machine 20 has a function to allow the game to be executed according to the value of game token recorded in the IC card. In the present example, the value of game token in the IC card 50 is decreased each time the game is executed. The same operation may be applied substantially, as described above, to the case where the value of game token is increased each time the game is executed. The game machine 20 is designed to enable only decrease processing of the value of game token and to unable increase processing thereof from the viewpoint of security against theft.

The adder 30 has functions of, upon insertion of the IC card 50,: determining whether the IC card has been specifically initialised or not; executing authorisation processing of the IC card 50 based on the information, such as card ID in the IC card 50 when the determination indicates the specific initialisation does exist; and substantially increasing the value of game token in the IC card 50 based on an amount of money deposited when the IC card has been authorised as proper, that is, a game token increase function The adder 30 also includes, for security, a historical information writing section 31, a start check section 32, a password check section 33, and an end-time check section 34. The historical information check section 31 writes in the IC card 50 the historical information (ID of the adder, date, increased value, user's card ID) when the game token is increased.

Upon starting, when the IC card for the administrator and that for the operator, each having individual card ID and password, are inserted, and each of those IC cards is determined as proper and finally the movement is approved by the password check section 33, the start check section 32 moves the adder 30 to the active state capable of processing the increase.

Upon starting, when, under the condition where the IC card for the administrator and that for the operator have been inserted respectively, respective passwords corresponding respectively to the IC cards for the administrator and for the operator are input and, for respective IC cards, the identical passwords coincide with the input passwords respectively, the password check section 33 allows the start check section 32 to introduce the active state.

The end-time check section has such function that, at the end of the business hours of the shop A, when the IC card for the administrator and that for the operator are inserted respectively, respective passwords corresponding respectively to the IC cards for the administrator and for the operator are input and, for respective IC cards, the identical passwords coincide with the input passwords respectively, the end-time check section 34 updates the remaining game token in the adder 30 to value zero to stop the adder 30.

The authorisation processing execution function, the historical information writing section 31, the start check section 32, the password check section 33, and the end-time check section 34 of the adder 30 are preferably, as described above, accomplished based on the SAM from the viewpoint of the security reliability. When using the SAM, the ID of the SAM will be available for the ID of the adder 30 which the historical information writing section 31 will write in.

The data totalling device (host computer) 40 is installed in each shop to which the game machine 20 belongs, and has a function for summing up the values of game token input by the game card data input device 10, the values of game token decreased by the game machine 20, and the value of game token increased by the adder 30 respectively, for each card 50.

The IC card 50 has a memory which can be read/written from an external device, and is structured to hold therein, as shown in FIG. 2, a MF (Master File) and other files including a PIN (Personal Identification Number), a card ID), a user information (sex, birthday, etc.), a DF (Dedicated File electronic purse/game token/limit), a security, URL (for all users), a DF (game data, game result, and URL (for users with excellent scores)), and a circular history file (historical information when the game token is increased (ID of the adder, date, increased value, card ID of the user)), and on the surface of the IC card is printed or embossed a user ID which is assigned and managed independently from the card ID in the memory. As for the user information, adding to the birthday, an age relating data relative to the age, such as an age or an age classification, or a combination of either of them and the birthday may be used.

The overall totalling device (overall host computer) TC collects and sums up all totalled results of the data totalling devices 40–40N in respective shops A–N.

Now at the shop A, an administrator inserts an IC card for administrator and inputs his password to start the adder 30. The start check section 32 executes the authorisation processing of the administrator's IC card, and determines that the administrator's IC card is valid. Then, the password check section 33 confirms that, with respect to the administrator's IC card, the individual password has coincided with the input one. Then, an operator inserts the IC card for operator and inputs his password. The start check section 32 executes the authorisation processing of the operator's IC card, and determines that the operator's IC card is valid. Then, the password check section 33 confirms that, with respect to the operator's IC card, the individual password has coincided with the input one.

Because the administrator's IC card and the operator's IC card, each having individual card IDs respectively, are inserted, each of the IC cards are determined as valid, and, for each IC card, each of the individual passwords has coincided with each of the input ones, then the start check section 32 allows the adder 30 to move to the active state capable of processing increase. Herein, the adder 30 will be loaded with game token of the value which is a bit higher than the expected daily sales. Accordingly, the adder 30 now can increase game token in the IC card 50. That is to say, the increasing process by the adder 30 is representative of such process that the adder 30 transfers its own game token into the IC card.

Unless there are two pieces of the IC cards, those for administrator and for operator which are managed by different persons, the adder 30 can not be activated, so that high level of security could be accomplished to such improprieties due to the theft of the IC cards for the administrator and the operator or the misappropriation.

In addition to the authorisation of the IC cards for the administrator and the operator, as described above, two password should be verified as well, so that even if the two pieces of IC card were stolen, the adder 30 could not be activated, and thereby higher level of security could be accomplished.

By regularly updating these IC cards for the administrator and the operator, a high level of security can be further enhanced.

A certain amount of money is deposited into the game card data input device 10 by a user in shop A. The game card data input device 10 inputs the game token into the IC card 50 based on the amount of money deposited, and also inputs the user information obtained by the user's operation into the IC card 50, and then issues the IC card 50. Either of the game token or the user information may be input prior to the other. The issued IC card will be inserted by the user into his favourite game machine 20. When the IC card is inserted, the game machine 20 determines whether the IC card 50 has been specifically initialised or not, and, when the determination indicates that the specific initialisation does exist, executes the authorisation processing of the IC card 50 based on the information such as card ID in the IC card 50. Then, the game machine 20, when it has confirmed that the IC card 50 is valid, reads the user information out of the inserted IC card 50 and subtracts a certain value of game token corresponding to a charge for one play and allows game execution. The IC card 50 holds a new balance updated by the subtracted result. The user then plays the game on the game machine 20. Upon finishing the game, the game machine 20 cancels an approval of further game execution, and allows the IC card 50 to be discharged. When the operation corresponding to the succeeding command is applied before the game being finished, the game may be continued succeeding the current status while the game token in the IC card 50 is additionally decreased.

At beginning of the game, since the game machine 20 performs two types of checking, the detection of the specific initialisation and the authorisation of the card, the level of security against the falsification of the cards is improved. In addition, the detection of the initialisation can reduce the possibilities of illegality caused by the intentional forging of devices by completing the detection in black box without making communication with high level computer having the game function. Since the game machine 20 is allowed only to decrease the game token, the game token in the IC card 50 cannot be increased, so improving security in the case of theft.

When the value of game token in the IC card 50 becomes lower level or down to zero as a result of game execution, the user, if he desires, may insert his IC card 50 into the adder 30 with the money deposited. The adder 30, upon insertion of the IC card 50, performs authorisation processing of the IC card 50 based on the information such as card ID in the IC card 50, and once it has determined that the IC card 50 is valid, it increases the game token in the IC card 50 depending on an amount of money deposited and writes in the IC card 50 the historical information (ID of the adder, date, increased value, card ID of the user) by the historical information writing section 31. With increased game token, the IC card 50 is entitled to play games again on the game machine 20.

The adder 30 performs authorisation processing of the IC card 50 before increasing game token, which provides security against improper use. Since the adder 30, upon increasing game token, writes the historical information into the IC card 50, the data totalling device 40 or the overall totalling device TC can detect an improper IC card 50 and the adder 30 based on the contents of the historical information and the ID of the adder 30, even if game token were improperly increased. At that time, for example, by informing the game machine 20 of the ID of the improper adder 30, the IC card 50 which has been loaded with game token by the improper adder 30 can be prevented from use before the IC card 50 is inserted. Furthermore, as to the writing of historical information, the attribute that limits the writing capacity only to the historical writing section 31 makes it extremely difficult for the historical information to be falsified. This historical information is preferably encrypted to be stored from the viewpoint of the difficulty of falsification.

In this type of shop A, the game card data input device 10, the game machine 20 and the adder 30 respectively send the combined data of required user information and updated (increased or decreased) game token information to the data totalling device 40 in response to the request thereof, for example, at predetermined intervals. The data totalling device 40 thereby may find and determine the user and his game token (sales). For example, when a game is finished with excellent record (high score), the game machine 20 may send the game result together with the user information of the IC card 50 to the data totalling device 40 in response to the operation corresponding to the totalling command. Thus the data totalling device 40 may find the user with excellent record (high score), and his game result. The data totalling device 40 sends a combination of the user information and the sales or that of the user information and the game result to the overall totalling device TC. Such operations are common to all shops A–N. Accordingly, the overall totalling device TC can manage the user trends, the amounts sold, and the game records in respective shops A–N by receiving and totalling the totalled results generated by respective data totalling device 40-40N in respective shops A–N.

Upon closing of the shop A, the administrator inserts the IC card for the administrator and inputs his password to stop the adder 30. The end-time check section 34 performs the authorisation processing of the administrator's IC card and determines that this administrator's IC card is valid. Then, the password check section 33, with respect to the administrator's IC card, determines that the individual password has coincided with the input one. Then, the operator inserts the IC card for the operator and inputs his password. The end-time check section 34 performs the authorisation processing of the operator's IC card and determines that this operator's IC card is valid. The PIN check section 33, for the operator's IC card, determines that the individual PIN has coincided with the input PIN. Since the IC cards for the administrator and for the operator, each having individual card ID, were inserted, each of the IC cards was determined as valid, and, for each of the IC cards, the individual password has coincided with the input one, then the end-time check section 34 updates the remaining game token within the adder 30 to the value zero and stops the adder 30. Thereby, the adder 30 is not available to use after the shop is closed, so that, high level of security could be accomplished even against improper increasing of the game token caused by intrusion after the shop has been closed.

According to the present invention, as described above, the adder 30 which can increase the game token in the IC card 50 may be provide with a high level of security over each time period of the shop, before opening, during business hours, and after closed. Also, as for the game machine 20, since the detection of the initialisation can reduce the possibilities of impropriety and it is not allowed to increase game token because of its operation, high level of security against theft may be accomplished.

As described above, according to the present embodiment, the data totalling device 40 in each shop A may find the sales of each game machine 20 for each time zone and also find the user information such as user's age and sex on each game machine 20 for each time zone based on the user information on each game machine 20 for each time zone. By forming and carrying out various plans such as, for example, (1) setting a time-limited promotion price on the basis of the sex and/or the age, (2) setting a dynamic promotion price of individual service such as birthday promotion price, or (3) making a presentation service of the game record ranking in the shop, based on the totalled data, interest in further use of the game may be stimulated.

Over all shops, however, the overall totalling device TC may manage the user trends, the amounts sold, and the game records for all shops A–N. For example, (1) basic marketing for planing and introducing new game may be easily performed, (2) the desire to use, the game devices maybe stimulated by collecting the ranking of the game records and making respective shops A–N publish the ranking information over all shops, and also, (3) the desire to use the game devices may be stimulated by showing the ranking information on the home page of the internet.

Figure 4:
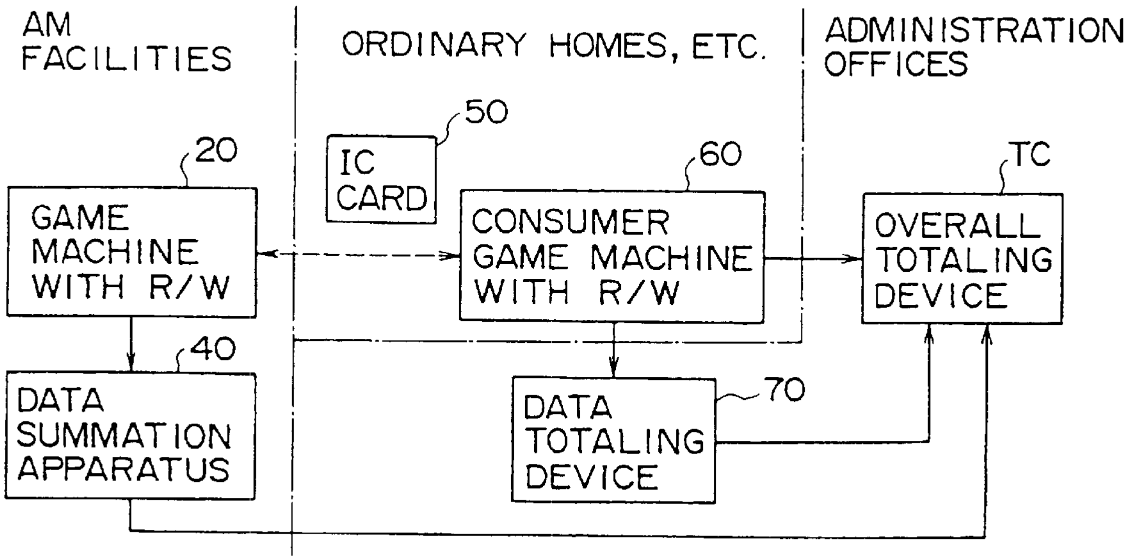
FIG. 4 is a schematic drawing illustrating an IC card system for a game playable at different locations.

FIG. 4 is a schematic drawing illustrating an IC card system for the game machine according to a further embodiment of the present invention, in which the same components as those of FIG. 1 are designated by the same reference numerals and detailed description is omitted (this also applies to other embodiments described below).

The present IC card system for a game machine is a system in which the IC card 50 of the first embodiment is applied to a consumer (CS) game machine (including personal computer game (PC)) for home use and the like such as NINTENDO 64 (which is a brand of Nintendo, Ltd.), SEGA SATURN (which is a brand of Sega Enterprises, Ltd.), or PLAYSTATION (, which is a brand of Sony Computer Entertainment Inc.), etc. This type of IC card system for a game machine, in addition to the arrangement shown in FIG. 1 (shown partly), further comprises a consumer game machine 60 belonging to each home and a plurality of data totalling devices 70 which are installed in respective areas so as to be connected to the consumer game machines 60 of respective homes and may collect and sum up the data from respective consumer game machines 60 and may send the totalled results to the overall totalling device TC.

The game machine 20 in the shop A has a function, adding to that described above, for storing and encrypting the game result in the IC card 50 in response to an input of the storing command when the game is finished, and another function for storing, in response to the control by the data totalling device 40 in the shop, URL (Uniform Resources Locators) for accessing a specific home page on the internet depending on the game results and the like. With regard to the method for encrypting the game result, a method for creating signature data using the game result and card ID is preferably employed since the card ID in memory (which is not available to the user) is different from the user ID on the card. Also, there are optional encrypting methods to be available including the method for compressing the game result to generate compressed data and adding the compressed data to the original game result. The consumer game machine 60 in the home has functions, adding to that for executing game starting from the initial state, for enabling the game to be executed commencing with the previously finished status based on the (decrypted) game result in the IC card 50 when the IC card 50 being inserted, for sending a combination of the game result and the user information such as card ID of the IC card 50 to the data totalling device 70 in response to an input of the sending command when the game being finished, and for accessing the home page on the internet based on the URL in the IC card 50.

Since the consumer game machine 60 is used in the non-profit areas, it has no function for increasing or decreasing the game token in the IC card 50. In addition, the consumer game machine 60 may be replaced by PC.

The data totalling device 70 works also as a host computer for the internet operation, and has functions for sending the combination of the game result sent from the consumer game machine 60 in each home and the user information such as card ID to the overall totalling device TC, and for connecting the consumer game machine 60 to the home page on the internet based on the URL indicated by the consumer game machine 60.

The game machine 20 in the shop A encrypts the game result and stores it in the IC card 50 in response to the user's operation corresponding to the storing command when the game is finished. The user goes home with the IC card 50 and inserts the IC card 50 into the consumer game machine 60 in his home. The consumer game machine 60 decrypts the encrypted game result in the inserted IC card 50 to read out and execute the game commencing with the previously finished status based on the game result. Furthermore the user may go, after having stored the game result in his home into the IC card 50, to the shop A to continue the game on the game machine 20 in the shop A. In addition, when, for example, the game is finished in high score, the consumer game machine 60 may send the combination of the game result and the user information to the data totalling device 70 in response to the user's operation corresponding to the sending command. The data totalling device 70 sends this combination of the game result and the user information to the overall data totalling device TC. Thereby, the overall data totalling device TC may collect the combinations of the game result and the user information in each home and manage the user in each home and the game record thereof.

Since the overall data totalling device TC manages, as described above, the user trend, the sales and the game record in each shop A–N, it can integrally manage the user common to each shop A–N and each home.

The game machine 20 in the shop A sends, for example, when the game is finished in excellent record (high score), the combination of the game result and the user information to the data totalling device 40 in response to the user's operation corresponding to the totalling command. The data totalling device 40 controls the game machine 20 so as to give the URL indicating special home page address when the game result is superior to the predetermined standard record (score). The game machine 20 in the shop makes the IC card 50 store the URL in response to this control. Then the user goes home with the IC card 50 and inserts the IC card 50 into the consumer game machine 60 in his home. The consumer game machine 60 in home indicates the URL based on the URL in the IC card 50 for the data totalling device 70 to access the home page on the internet. The data totalling device 70 reads out and checks the game result stored in the IC card 50 by controlling the consumer game machine 60 in order to confirm that the user is qualified for accessing the indicated URL. After that, the data totalling device 70 connects the consumer game machine 60 to the home page on the internet based on this URL.

According to the present embodiment as described above, the game result is stored within the IC card, which enables the game to be executed on the consumer game machine 60 in home succeeding the game machine 20 in the shop and vice versa, so that an interest to use the game machine which, in particular, is adapted for a certain sort of game requiring long time (Role Playing Game etc.) may be stimulated.

In addition, the overall data totalling device may integrally manage the user common to each shop A–N and each home. The game record ranking may be shown in respective shops A–N as well as on the home page etc. Further, by setting a promotion period and giving a certain benefit based on the game record ranking for the game common to the game machines 20–20N in respective shops A–N and the consumer game machines 60 in respective homes, more utilisation of the game machine may be stimulated in respective shops A–N, and, at the same time, the user informed of this promotion by the home page etc., in home, may be prompted to take part. In relation to the internet, the specific home page on the internet may be accessed only by inserting the IC card 50 into the consumer game machine 60. In addition, the home page server may identify the user based on the card ID and the user information in the IC card 50. Also, the top players on the game records may be given out by the internet.

Besides, since the game result is encrypted to be stored in the IC card 50, consistency and anti-falsification of data can be ensured, giving the users fairness and relief, for example, upon announcement of game results, and thus the promotion of more frequent use of the games can be expected.

Upon encryption, the game result is converted into signature data of card ID, and thereby the card ID in the memory differs from the user ID on the surface of the card, so that the prevention of falsification can be greatly improved.

Since the game record has 20 value exchangeable for money, no monetary loss may be caused and no serious damage is induced with respect to the system operation even if the record is falsified, so that substantially excellent security may be achieved.

Though, in the present embodiment, the case where the URL is given to the user with superior record (score) to the standard is described, the game records may be divided into several classes to prepare URLs for respective classes and to give them out based on the classified game records. In addition, the URL may be given to certain users under special conditions, for example, a user in his birthday or another user who uses the game machine many times. Further, the home page may be accessed in the same manner by the use of the URL which is input when the IC card being issued and is directed to all users.

Since the data totalling device 70 manages the access to the home page based on the requirement for access set on the specific home page respectively, it controls the consumer game machine 60 requiring the connection so as to read out the user information and the game record stored in the IC card and confirms that the requirement is satisfied.

Figure 5:
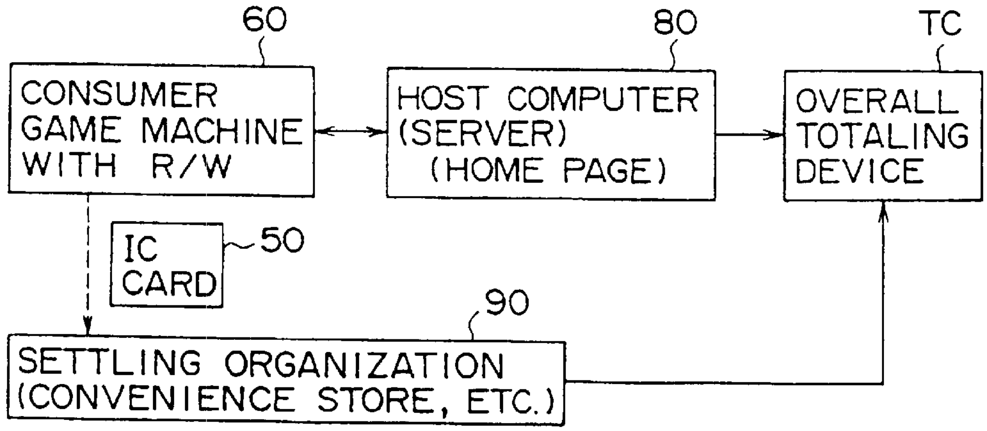
FIG. 5 is a schematic drawing illustrating an application of the system for the IC card for a game in a transaction setting.

FIG. 5 is a schematic drawing illustrating an example of application of the IC card system for the game machine according to another embodiment of the present invention. This application illustrates a mode of a mail order system which allows the consumer game machine 60 in home to buy the articles through the internet.

The consumer game machine 60 selects the articles to be bought on the home page in response to the user's operation. A host computer 80 of the home page identifies the user based on the card ID of the TC card 50 and issues a receipt number to informs the user of the receipt number and, at the same time, gives the combination of the card ID and the receipt number to the overall totalling device TC. The overall totalling device TC retains and keeps the combination of the card ID and the receipt number for a predetermined certain period until a payment notification will have been sent from a settlement organisation 90 having POS (Point Of Sale) such as, for example, convenience store. The user then goes to the settlement organisation 90 with his IC card 50 and delivers the IC card 50 with the receipt number to a clerk thereof. In the settlement organisation 90, a computer, though not shown, reads out the card ID from the IC card 50 and sends the receipt number input and the card ID to the overall totalling device TC in response, to the clerk's operation. The overall totalling device TC determines as to whether there is a retained combination of the card ID and the receipt number corresponding to that sent from the settlement organisation 90, and notifies the computer in the settlement organisation 90 of the result. The computer then shows the reply indicating the offer being proper and prints out a debit note of the article by the printer.

Similar to the usual payment of the public utilities charges, upon receiving the payment from the user, the computer reads a bar code on the debit note and sends a notification indicating the payment for the article being finished to the overall totalling device TC. The debit note, on which a received stamp is affixed, is sent to the user. Upon receiving the notification of payment, the overall totalling device TC implements a process for sending the article to the user's home by notifying, for example, the sending section of the article of the combination of the identification information of the article and the user's name and address.

According to the present embodiment, as described above, a charge is not settled on the internet and the article is delivered after the charge is received, so that the mail order system on the internet may be put in practice with extreme security.

When the URL differs depending on the game results, the sales amount of the articles maybe estimated for each home page based on the issued number of the URL.

A particular security system applicable to the embodiments described above will be described in relation to the accompanying drawings as before.

The IC card 50 has, in addition to the functions described above, a function for sending to the game machine 20 in response to a request, the card ID for calculating the authorisation data based on a diversified cipher key, or an authorisation data calculated by the use of the diversified cipher key of the IC card 50 stored in itself, or a game token value, or another function of security for confirming the authorisation data which the game machine has calculated by the use of the diversified cipher key based on the card ID calculated by the game machine, or a request for payment of the game token, each being received from the game machine 20, and for implementing a counter-processing such as disconnection of communication when an impropriety is found.

The game machine 20 has, in addition to the functionality described above, a security function for inspecting each of the authorisation data, the card ID and the game token value, each being transmitted from the IC card 50, and implementing a counter-processing such as disconnection of communication or notification to the manager when an impropriety is found. Further, the game machine 20 has a function that it does not decrease the game token for (new execution, re-execution or succession of) individual game within own game machine 20 from the viewpoint of prompter processing, which differs from that of the first embodiment, but substantially decreases the game token in the IC card 50 only one time when all games are finished and the user leaves the game machine 20. The game machine 20, however, is capable of performing the security function described above even if the same constitution as the first embodiment in which the game token is substantially decreased for each game is employed. Conversely, it is needless to say that the function in which the game token is substantially decreased only one time when all games are finished may be applied to the game machine 20 described above.

The operation of above IC card system will be described but duplicate description will be omitted and the security function between the IC card 50 and the game machine 20 will be described.

Figure 6:
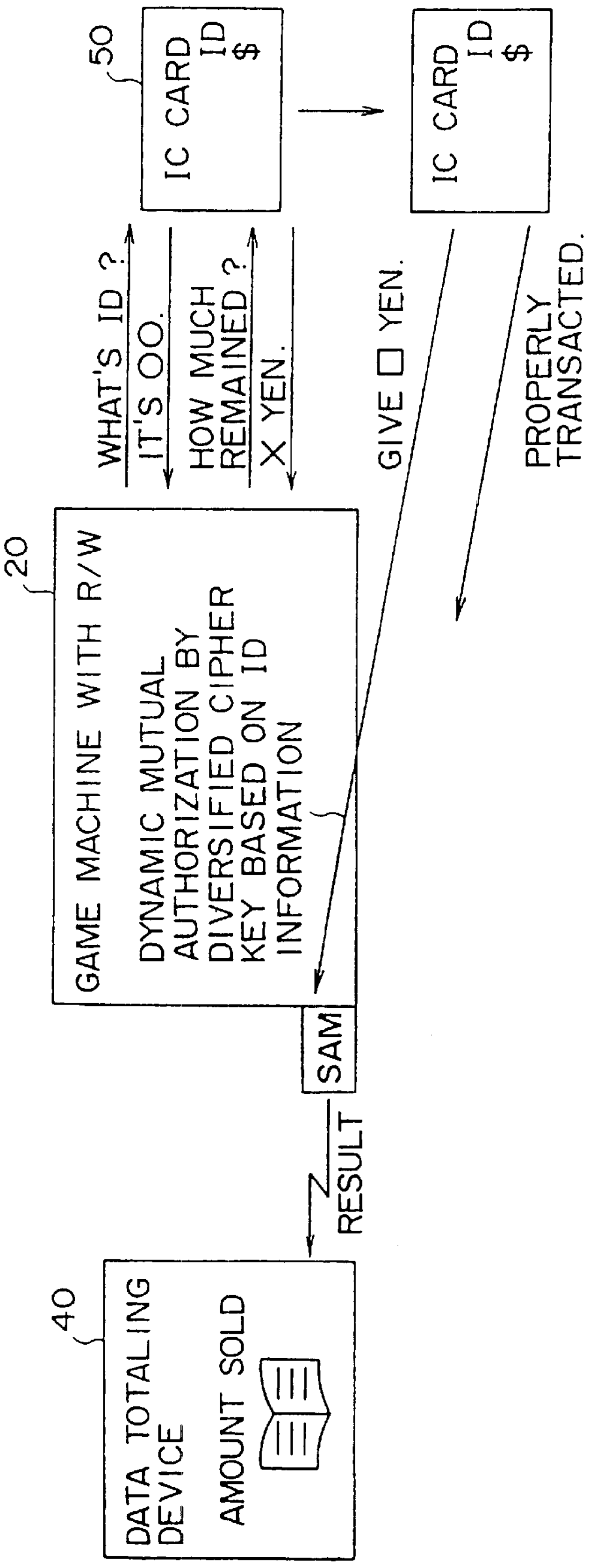
FIG. 6 is a schematic drawing depicting the operation of the transaction and security system for the IC card for a game of FIG. 5.

When the IC card 50 is inserted into the R/W of the game machine 20, as shown in FIG. 6, the game machine 20 and the IC card 50 perform the so-called dynamic authorisation, which interposes uncontrollable element such as random number, by the diversified cipher key based on the ID information. The card ID which uniquely belongs to the IC card 50 Is used for that. A key (so-called master key) used for deriving the diversified cipher key from the ID information is stored in the game machine 20. The diversified cipher key is calculated by the use of the master key and stored in the TC card 50 during the initialisation thereof.

The dynamic authorisation is conducted as follows. The IC card 50 judges whether the game machine 20 is properly manufactured or not (improperly forged) by inspecting the authorisation data which the game machine 20 calculates by the use of the diversified cipher key for inspecting the authorisation data, which is calculated based on the card ID of the TC card 50, and transmits, with the diversified cipher key for inspecting the authorisation data, which is stored in the IC card 50 itself. When the game machine 20 is judged as a forged machine, the IC card 50 immediately finishes the processing by the disconnection of the communication and the like, and alternately, when it is judged as properly manufactured, the IC card 50 responds to the reading-out of the required information for making the game machine 20 inspect the authorisation data calculated by the use of the diversified cipher key for calculating the authorisation data, which is stored in the IC card 50 itself.

Then the game machine 20 judges whether the IC card 50 is properly issued or not (improperly forged) by calculating the diversified cipher key for calculating authorisation data based on the card ID of the IC card 50 and by inspecting the authorisation data transmitted from the IC card 50, and when the IC card 50 is judged as a forged card, the game machine 20 finishes the processing by the disconnection of the communication and so on and notifies the manager etc., of the use of the forged IC card.

In the dynamic mutual authorisation process described above, the order of the two processes, that is, the inspection of the authorisation data from the game machine 20 by the IC card 50 and the inspection of the authorisation data from the IC card 50 by the game machine 20, may be changed.

Though above example is described by the use of symmetric type cipher key system (so-called common cipher key system), the same flow of inspection may be applied to the case of asymmetric type cipher key system (so-called public cipher key system). The above dynamic authorisation may be conducted during the process of subtraction and addition of the game token belonging to the IC card 50 and the game machine 20. In addition, the above dynamic authorisation may be conducted also between the IC card 50 and the adder 30.

The game machine 20 requires the IC card 50 to transmit the value of game token when the judgement indicates the IC card being properly issued. In response to that, the IC card 50 transmits the currently remaining value of game token to the game machine 20. The game machine 20 then compares relative size between the value of game token received from the IC card 50 and that required for executing the game on itself, and, when the value of game token received from the IC card 50 is less than that required for executing the game, the game machine 20 notifies the user that the game cannot be executed and discharges the IC card 50 from the R/W. When the value of game token received from the IC card 50 is more than that required for executing the game, the game machine 20 allows the game to be executed. Thereby, the user may play the game as described above and, when the game is finished, replay or continue the game by inputting a command, if desired.

The game machine 20 subtracts the value of game token required for executing the game from the value received from the IC card 50 when the game being finished and, when the replay or the continuation of the game is required, compares the relative size between the value of game token after subtraction and that required for executing the game. At the time when the value of game token after subtraction becomes less than that required for executing the game, the game machine 20 intercepts the replay or the continuation of the game and forces the process of the game function to terminate. When the game function is forced to terminate or the game is finished at will, the game machine 20 gives the IC card 50 a demand for payment requiring to pay the summed-up value of the subtraction results.

The IC card 50 judges whether the value of game token requested by the game machine 20 is proper or not, and, when the IC card 50 judges the value to be improper (when the value of requirement doesn't indicate the features of the game token or is more than that in the memory), it terminates the processing, and, alternately, when it judges the value to be proper, it decreases the game token in the memory by the value in the demand of payment and notifies the game machine 20 that the game token is decreased. Then, the game machine 20 judges whether the notification from the IC card 50 is proper or not, and, when it judges to be improper, it terminates the processing, and, when it judges to be proper, it transmits the card ID and the decreased value of game token (and the user information described above, etc.) to the data totalling device 40. After having finished the transmission, the game machine 20 terminates the processing and discharges the IC card 50 from the R/W.

According to the present embodiment, since the security function is realised by, adding to the effect of the first embodiment, the security system always operating between the IC card 50 and the game machine 20 on respective devices without any exclusive security device being installed, the security level may be improved and, at the same time, the processing capacity and speed of security may be also improved. More specifically, to the security system in the first embodiment operating always between the IC card 50 and the adder 30 on respective devices, another security system between the IC card 50 and the game machine 20 is added, so that the security system level may be more improved.

When a part or all of the security function described above is stored in the previously described SAM (installed in the game machine 20 and the adder 30) to be operated thereby, high degree of security may be realised because of the hidden information and calculation processes.

Though the embodiments described above employ systems in which the value of digital data of game token is decreased corresponding to the times of game executed, another case is where the value of digital data of game token is increased corresponding to the times of game executed may also provides the same effect as a result of the application of the present invention because the game token is substantially decreased in this case also as described above.

Operation of above security system in respect of the three cases in which the IC card 50, the game machine 20, and a SAM thereof have been forged respectively proceeds as follows:

Forged IC Card

Figure 7:
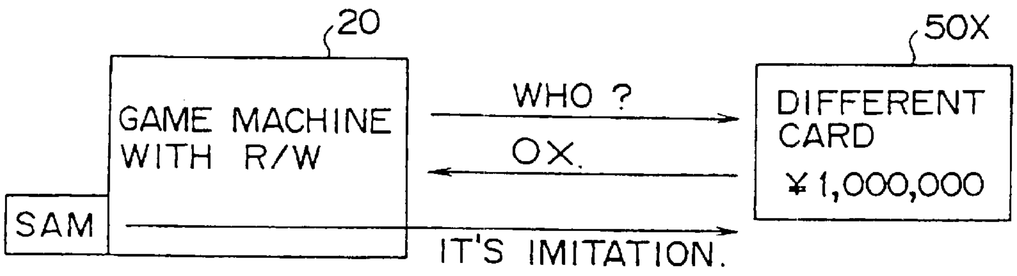
FIGS. 7, 8 and 9 are schematic drawings depicting the operation of the security system for the IC card for a game according to the present invention.

Once a properly issued IC card 50 is inserted into the R/W of a proper game machine 20, a processing goes on as described referring to FIG. 6. The same processing would be applied to each form of anti-forgery as follows. When an forged IC card SOX is inserted into the R/W of a proper game machine 20, the determination processing based on the inspection of the authorisation data among above-described plurality of processings is executed, as shown in FIG. 3, by SAM of the game machine 20. At that time, as shown in FIG. 7, when the result of the determination indicates the forged IC card 50X, the SAM of the game machine 20, in the same manner as described above, terminates the processing by the disconnection of the communication and the like, and notifies the administrator and the like that the forged IC card has been used.

Although the present embodiment performs almost the same operation as that described previously, the SAM of the game machine 20 conducts the authorisation processing to determine as to whether the IC card is the forged IC card 50X or not, which prevents an operation processing and an operation result from being disclosed outside and enables to react quickly against the forged IC card and, consequently, improves the security level.

Also in the case of forged IC card 50X where the game token has been improperly written into the properly issued IC card, once the IC card 50X sends the information of game token to the game machine 20, the SAM of the game machine 20 checks the ID information of (the SAM installed in) the adder used for increase processing of the game token value, the ID information being added to the information of the game token, and thereby determines the validity of the addition processing, and, as a result, can prohibit the use of the game token improperly written in.

(Forged Game Machine)

Figure 8:
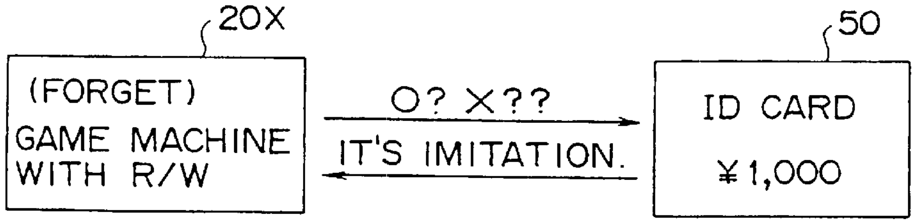

Once a properly issued IC card 50 is inserted into the R/W of a forged game machine 20X, as shown in FIG. 8, the forged game machine 20X requests the IC card 50 to execute a certain function. However, the IC card 50 confirms the request of the forged game machine 20X and finds that the dynamic authorisation by diversified cipher key based on the ID information has not been executed yet, which should have been executed with the proper game machine 20, and consequently the IC card 50 rejects this request. As a result, the IC card 50 determines that the forged game machine 20X must be a forged machine, and terminates the processing by, for example, disconnecting the communication. Accordingly, the use of the IC card 50 by the forged game machine 20X can be prevented.

Since the IC card 50 executes authorisation processing for the forged game machine 20X, a quick action can be taken to the forged game machine 20X, and thus level of security can be improved. Therefore, even if a game token is improperly attempted to be withdrawn from an IC card 50, the IC card 50 reveals its self-defence function, such as disconnection of the communication. Thus, improper uses of an IC card and a game machine can be prevented.

Even if the IC card 50 does understand the request from the forged game machine 20X, since the ID card 50 would force the forged game machine 20X to calculate the authorisation data based on its own card ID in the same manner as is described above, the improper use of the game machine can be prevented.

Forged SAM

Figure 9:
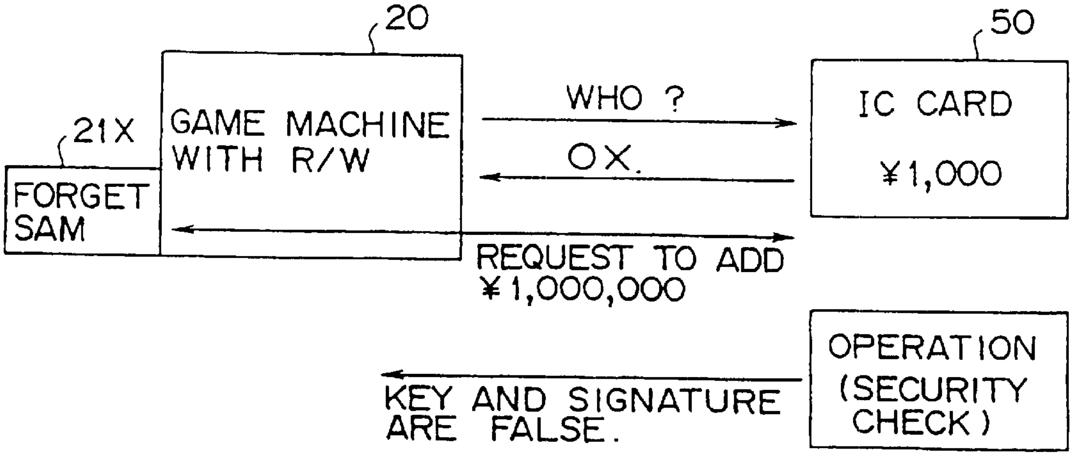

As shown in FIG. 9, when a forged SAM 21*x* is installed in a properly manufactured game machine 20, the game machine performs with the IC card 50 so-called dynamic authorisation, which interposes uncontrollable element such as random number, by the diversified cipher key based on the ID information, as shown in FIG. 6. After the authorisation processing described above, the IC card 50, in response to the request of the game machine 20, approves the desired information to be read out so as to make the game machine 20 execute the dynamic authorisation based on the card ID of itself. Then, the forged SAM 21*x* installed in the game machine 20 transmits alteration command of game token to the IC card 50. This alteration command includes, for example, such contents as increasing (decreasing) game token to the limited amount. Since this kind of alteration command is accompanied with the authorisation using the diversified cipher key by the SAM and also is appended by the signature of the SAM, the IC card 50 executes authorisation processing based on this alteration command, so that it can confirm that the alteration command has been sent by the forged SAM 21*x*.

Alternatively, when the IC card 50 is structured so that it can store alteration of game token corresponding to the using condition of the game (e.g., increase of game token for good resulting game during game play, etc.), even if the IC card 50 received the alteration command to increase (decrease) game token from a game machine 20, the IC card 50 could confirm that the command is sent from the forged game machine 21X and thereby disconnect the communication.

Even if an improper processing is attempted to the properly manufactured game machine 20 by installing a forged SAM 21*x* therein, a properly issued IC card 50 can not be used thereon.

This means that, in the present invention, even if the improper processing would be executed by the forged SAM 21*x* or the properly manufactured SAM 21, the IC card 50 could take a quick response thereto because it verifies the SAM. Even if there was an attempt of making the forged SAM 21*x* increase (decrease) improperly the game token, the IC card 50 could execute a self-defence function to disconnect the communication or to disapprove the IC card itself, and thereby prevent the improper use of the IC card 50.

Since the security system using SAM runs between the IC card 50 and the game machine 20, even in the case of the use of forged units, they would become disabled due to the security system using the SAM, and, at the same time, the system may notify the administrator and the like of the user who have used the forged units. The security system for the IC card 50, the game machine 20, and the adder 30 described above executes the authorisation processing using SAM, the security level can be greatly improved.

As well as those embodiments described above, there are other embodiments where the value of digital data of game token is increased corresponding to the times of game executed may also provides the same effect as a result of the application of the present invention because the game token is substantially decreased in this case also as described above.

Although one embodiment described above employs the case where the ID storage means for the administrator and for the operator are respectively defined as the IC cards for the administrator and for the operator, it is not limited to this. For example, a memory card may be used in place of the IC card. Furthermore, the password may be input without using storage means such as cards. Yet further, the combination of the password used by an administrator and the operator's IC (memory) card inserted by an operator may also be acceptable. After the card has been inserted, the system may require input of the password or require nothing but the ID authorisation processing at the insertion. No matter which case is employed, any system wherein information can be managed by the administrator and the operator respectively could be included in the concept of the present invention. It means that the practice as described above can bring forth the same effect.

Each security system described in each embodiment could be appropriately selected and provided as desired. It is most preferable that all of the security functions described above are employed, but a system may be acceptable, wherein the writing of historical information by the SAM is omitted, and the IC cards for the administrator and the operator are verified only by the ID authorisation processing at the insertion, omitting the input of password. Even the system omitting some of the security functions could accomplish high level of security by the remaining security functions executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card system for a game machine using an IC card comprising:

a game token input means for inputting a game token to the IC card based on an amount of money deposited and then issuing the IC card;

a game device for decreasing a value of game token in the IC card and allowing a game to be executed based on the decreased value of game token when the IC card is inserted;

a totaling means for a shop, which is installed in each shop to which the game device belongs, wherein the totaling means collects and sums up, for each IC card, the values of game token input by the game token input means, and the values of game token decreased by the game device respectively;

a game result storing means for storing a game result in the IC card in response to an input of a storing command when the game run by the game device is finished;

a non-profit game means which is disposed in other place than the shop, wherein the non-profit game means allows a non-profit game to be executed succeeding a previously finished status based on the game result in the IC card;

a game result sending means for sending the game result of the non-profit game means in response to an input of a sending command when the non-profit game is finished;

a non-profit game result totaling means for totaling the non-profit game results sent from the game result sending means; and an overall totaling means totals the totaled results of the totaling means for a shop and those totaled by all non-profit game result totaling means.

2. An IC card system for a game machine according to claim 1, further comprising a game token increase means for substantially increasing a value of game token in the IC card based on an amount of money deposited, wherein the totaling means for a shop is provided with an increased token totaling section for totaling, for each IC card, the values of game token increased by the game token increase means.

3. An IC card system for a game machine according to claim 1, wherein the game token input means has a user information writing section for writing user information about a user of the IC card, and the totaling means for a shop is provided with a user information totaling section for totaling the user information in the IC card whose game token is decreased by the game device.

4. An IC card system for a game machine according to claim 1, further comprising:

(a) a game result sending section for a shop for sending the game result to the totaling means for a shop in response to an input of a totaling command when the game is finished; and (b) a game result totaling section which is installed in the totaling means for a shop, wherein the game result totaling section totals the game result sent from the game result sending section for a shop.

5. An IC card system for a game machine according to claim 1, wherein the game device is provided with a game succeeding section which allows the game to be executed succeeding a previously finished status based on the game result in the IC card, and the game result in the IC card being used on both of the game device belonging to the shop and the non-profit game means disposed in other place than the shop.

6. A security system for an IC card for a game comprising:

a game token input means for inputting a game token to the IC card based on an amount of money deposited and then issuing the IC card;

a game device for decreasing a value of game token in the IC card and allowing the game to be executed based on the decreased value of game token when the IC card is inserted;

a game token increase means for increasing the value of game token in the IC card based on an amount of money deposited;

a totaling means for a shop which is installed in each shop to which the game device belongs, wherein the totaling means collects and sums up, for each IC card, the value of game token input by the game token input means, the value of game token decreased by the game device, and the value of game token increased by the game token increase means respectively; wherein the game token increase means comprises a historical information writing section to write historical information onto the IC card when increasing the game token;

a game result storing means for encrypting a game result and storing in the IC card in response to an input of a storing command when the game being finished, a non-profit game means which is disposed in other place than the shop and allows a non-profit game to be executed succeeding the previously finished state based on the encrypted game result in the IC card;

a game result sending means for sending the non-profit game result of the non-profit game means in response to an input of a sending command when the non-profit game being finished;

a non-profit game result totaling means for collecting and summing up the non-profit game results sent from the game result sending means; and an overall totaling means collects and suns up all of the totaled results of the totaling means for a shop and those generated by respective non-profit game result totaling means.

7. A security system for an IC card for a game according to claim 6, wherein:

(i) the game token increase means further comprises a user information writing section for writing user information about a user of the IC card on the IC card; and (ii) the totaling means for a shop comprises a user information totaling section for totaling user information in the IC card whose game token is decreased by the game device.

8. A security system for an IC card for a game according to claim 7, wherein the user information includes user data corresponding to age.

9. A security system for an IC card for a game according to claim 6, further comprising:

(i) a game result sending section for a shop which sends the game result to the totaling means for a shop in response to an input of a totaling command when the game is finished; and (ii) a game result totaling section which is installed in the totaling means for a shop, wherein the game result totaling section collects and sums up game results sent from the game result sending section for a shop.

* * * * *